(12) United States Patent
Platt et al.

(10) Patent No.: US 11,843,231 B2
(45) Date of Patent: Dec. 12, 2023

(54) PRESS FIT CONDULET DEVICES, ASSEMBLIES SYSTEMS AND METHODS FOR ELECTRICAL RACEWAY FABRICATION

(71) Applicant: EATON INTELLIGENT POWER LIMITED, Dublin (IE)

(72) Inventors: Joseph Edward Platt, Baldwinsville, NY (US); Joseph Vincent Lopez, Camillus, NY (US); Vinod Manohar Shet, KA (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 12 days.

(21) Appl. No.: 17/590,610

(22) Filed: Feb. 1, 2022

(65) Prior Publication Data

US 2022/0158425 A1    May 19, 2022

Related U.S. Application Data

(62) Division of application No. 16/857,528, filed on Apr. 24, 2020, now Pat. No. 11,398,719.

(Continued)

(51) Int. Cl.
*H02G 3/06* (2006.01)
*H02G 3/04* (2006.01)

(52) U.S. Cl.
CPC ............ *H02G 3/0406* (2013.01); *H02G 3/06* (2013.01)

(58) Field of Classification Search
CPC .............................. H02G 3/0406; H02G 3/06

(Continued)

(56) References Cited

U.S. PATENT DOCUMENTS

| 2,158,757 A | 5/1939 | Kuestermeier |
| 3,486,774 A | 12/1969 | Corey |

(Continued)

FOREIGN PATENT DOCUMENTS

| CN | 102418822 | 4/2012 |
| CN | 202772514 U | 3/2013 |

(Continued)

OTHER PUBLICATIONS

International Search Report and Written Opinion; Corresponding PCT Application No. PCT/EP2020/025196; Authorized Officer Henri Fromentel; dated Jul. 6, 2020.

*Primary Examiner* — Timothy J Thompson
*Assistant Examiner* — Michael F McAllister
(74) *Attorney, Agent, or Firm* — Squire Patton Boggs US LLP

(57) ABSTRACT

A conduit outlet assembly for a rigid metal conduit raceway of an electrical system is provided. A conduit outlet assembly includes a gasket, a gripping ring, and a condulet assembly. The gasket is sized to circumscribe an outer surface of a rigid metal conduit of the rigid metal conduit raceway. The gripping ring is sized to circumscribe the outer surface of the rigid metal conduit. The condulet assembly is sized to receive the rigid metal conduit, and includes an adapter and a condulet. The adapter includes a compression section and a coupling section, wherein the compression section is sized to receive the rigid metal conduit with the gasket and the gripping ring disposed thereon. The condulet is sized to receive the coupling section of the adapter.

19 Claims, 6 Drawing Sheets

Related U.S. Application Data

(60) Provisional application No. 62/840,551, filed on Apr. 30, 2019.

(58) Field of Classification Search
USPC .......................................................... 174/68.3
See application file for complete search history.

(56) References Cited

U.S. PATENT DOCUMENTS

| | | | |
|---|---|---|---|
| 5,695,224 A * | 12/1997 | Grenier | F16L 37/091 |
| | | | 285/308 |
| 6,694,586 B1 | 2/2004 | Goop | |
| 6,729,009 B2 | 5/2004 | Goop | |
| 6,843,096 B2 | 1/2005 | Viegener et al. | |
| 7,146,839 B2 | 12/2006 | Goop | |
| 7,201,382 B2 | 4/2007 | Viegener | |
| 7,237,427 B2 | 7/2007 | Viegener | |
| 7,316,429 B2 | 1/2008 | Viegener | |
| 7,481,462 B2 | 1/2009 | Aming et al. | |
| 7,484,398 B2 | 2/2009 | Hofmann | |
| 7,587,924 B2 | 9/2009 | Viegener et al. | |
| 7,658,419 B2 | 2/2010 | Viegener et al. | |
| 7,845,371 B2 | 12/2010 | Hartung | |
| 7,862,089 B2 * | 1/2011 | Crompton | F16L 19/08 |
| | | | 285/39 |
| 7,980,600 B2 | 7/2011 | Hofmann | |
| 8,025,315 B2 | 9/2011 | Schreckenberg et al. | |
| 8,042,841 B2 | 10/2011 | Viegener | |
| 8,262,138 B2 | 9/2012 | Rischen et al. | |
| 8,480,134 B2 * | 7/2013 | Crompton | F16L 37/0915 |
| | | | 29/521 |
| 8,495,782 B2 | 7/2013 | Franke et al. | |
| 8,517,431 B2 * | 8/2013 | Arning | B21C 37/28 |
| | | | 285/256 |
| 8,567,034 B2 | 10/2013 | Hofmann et al. | |
| 8,578,751 B2 | 11/2013 | Hofmann | |
| 8,745,843 B2 | 6/2014 | Michels et al. | |
| 8,770,230 B2 | 7/2014 | Steinhanses et al. | |
| 9,004,541 B2 | 4/2015 | Sinoplu et al. | |
| 9,109,724 B2 | 8/2015 | Meissner et al. | |
| 9,234,611 B2 | 1/2016 | Aming et al. | |
| 9,249,907 B2 | 2/2016 | Mester | |
| 9,334,987 B2 | 5/2016 | Hofmann | |
| 9,541,228 B2 * | 1/2017 | Bobo | F16L 37/091 |
| 9,551,445 B2 * | 1/2017 | Morse | H02G 3/06 |
| 9,599,266 B2 | 3/2017 | Schreckenberg et al. | |
| 9,601,914 B2 * | 3/2017 | Chiu | H02G 15/007 |
| 9,851,028 B2 * | 12/2017 | Stout | F16L 37/091 |
| 9,920,865 B2 | 3/2018 | Schroeder et al. | |
| 10,001,230 B2 | 6/2018 | Rischen et al. | |
| 10,180,202 B2 * | 1/2019 | Crompton | F16L 37/0915 |
| 10,330,231 B2 | 6/2019 | Meissner | |
| 10,359,132 B2 | 7/2019 | Hartmann et al. | |
| 10,374,333 B2 * | 8/2019 | Le Quere | F16L 37/0915 |
| 10,400,929 B2 * | 9/2019 | Crompton | F16L 37/0915 |
| 2002/0185868 A1 * | 12/2002 | Snyder, Sr. | F16L 37/091 |
| | | | 285/317 |
| 2003/0038481 A1 | 2/2003 | Viegener | |
| 2007/0075542 A1 * | 4/2007 | Glaze | F16L 25/01 |
| | | | 285/322 |
| 2011/0049875 A1 * | 3/2011 | Stults | F16L 13/142 |
| | | | 285/345 |
| 2012/0284994 A1 * | 11/2012 | Crompton | F16L 37/0915 |
| | | | 285/308 |
| 2015/0354738 A1 * | 12/2015 | Morse | H02G 15/013 |
| | | | 285/39 |
| 2016/0161038 A1 * | 6/2016 | Crompton | F16L 37/091 |
| | | | 285/340 |
| 2017/0030489 A1 | 2/2017 | Decesare et al. | |
| 2017/0082231 A1 * | 3/2017 | Crompton | F16L 25/0018 |
| 2017/0356576 A1 | 12/2017 | Shemtov | |
| 2019/0067922 A1 * | 2/2019 | Platt | F16L 13/142 |
| 2019/0093807 A1 * | 3/2019 | Crompton | F16L 19/08 |
| 2019/0309882 A1 * | 10/2019 | Huggins | F16L 21/03 |
| 2019/0379190 A1 * | 12/2019 | Morse | H01R 4/26 |
| 2020/0309299 A1 * | 10/2020 | Williams | F16L 37/0927 |

FOREIGN PATENT DOCUMENTS

| | | |
|---|---|---|
| CN | 108087647 | 5/2018 |
| GB | 406724 | 3/1934 |

* cited by examiner

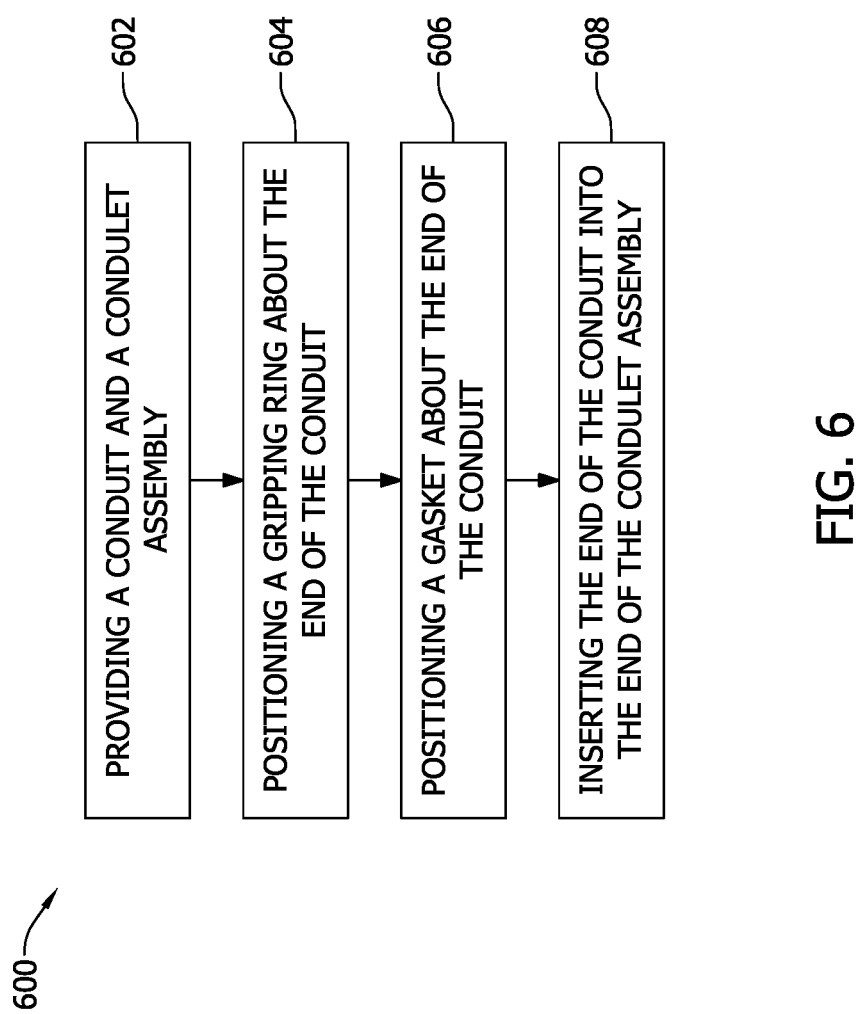

PRESS FIT CONDULET DEVICES, ASSEMBLIES SYSTEMS AND METHODS FOR ELECTRICAL RACEWAY FABRICATION

CROSS REFERENCE TO RELATED APPLICATIONS

This application is a Divisional application of U.S. patent application Ser. No. 16/857,528, filed Apr. 24, 2020, which claims the benefit of U.S. Provisional Application No. 62/840,551, filed Apr. 30, 2019, the entire contents and disclosures of which are hereby incorporated by reference herein in their entirety.

BACKGROUND

The field of the disclosure relates generally to conduit assemblies or raceways for electrical systems, and more particularly to cold press conduit outlet assemblies and condulet assemblies for interconnecting electrical conduits.

Rigid metal conduit (RMC) raceways are often used to carry and protect electrical wiring or cabling in an electrical system of an industrial facility, such as gas stations, refineries, and power plants. Conventional RMC raceways are constructed by coupling lengths of threaded conduits together with threaded couplers, e.g., condulet fittings or condulets, with the couplers also providing access points to the wires to assist in pulling wires through the conduit over large distances. Condulets are known to effect a change in direction of a conduit and cabling in the fabrication of an RMC raceway.

While known condulets are effective to provide the desired interconnections of conduit, they are prone to certain problems and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

FIG. 6 is a process flow chart illustrating an exemplary method of fabricating an electrical raceway with the press-fit condulet assemblies shown in FIGS. 2-5.

DETAILED DESCRIPTION

Figure 1:
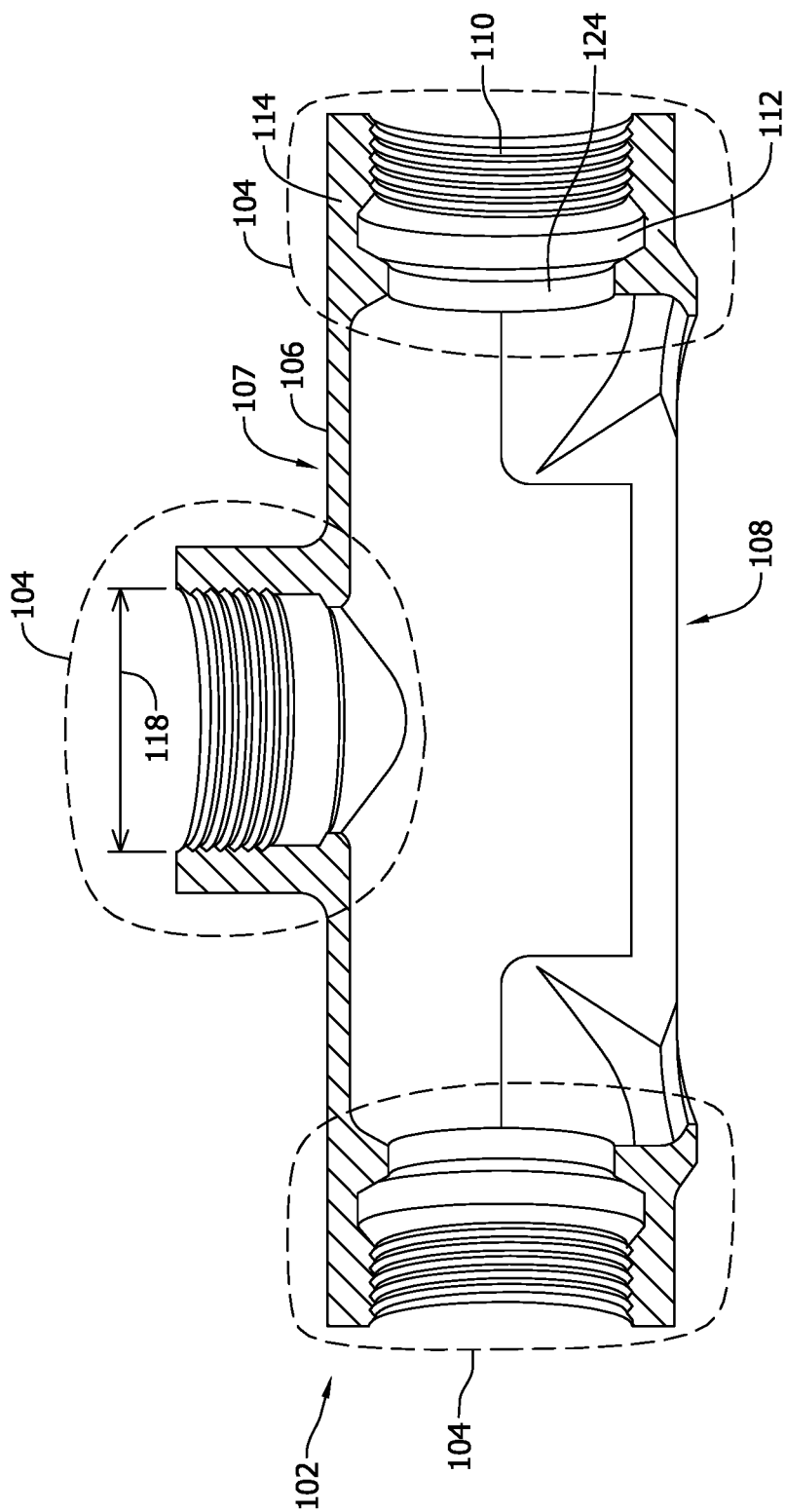
FIG. 1 is a perspective cross-sectional view of an exemplary known condulet.

Conventional conduits provide interconnection of rigid metal conduits to fabricate a wire or cable raceway in an electrical system. Threaded attachment of rigid metal conduits to one another and to threaded condulets is conventionally performed in the installation of conduit systems, but is sub-optimal in some aspects.

For example, when a length of threaded conduit exceeds a length needed for a given installation, the conduit is cut and new threads are typically formed on the remaining unthreaded end after cutting such that the conduit can still be coupled to a threaded condulet. However, forming new threads in the cut conduit can be time-consuming, dangerous, and laborious, thus increasing the cost, risk, and time to construct a conduit raceway. Moreover, forming threads on an end of a conduit that has been cut without creating imperfections (e.g., an angled end of the conduit, or burrs and the like on the inside or outside of the conduit) in the connections requires a level of skill that the average worker may or may not possess. Burrs and the like may damage the insulation of electrical wires or cables being pulled through the conduit and/or the threaded connection between the conduit and the condulet, resulting in undesirable reliability issues.

Press fit couplers have been proposed for use in the assembling of a raceway, but are limited in some aspects. Specifically, known press fit couplers can be difficult to use with certain types of conduit, can be undesirably complicated and expensive from a component manufacturer perspective, require specialty tools to install, or can be difficult from the installer's perspective to reliably complete an adequate press fit that includes an electrically-grounded connection.

Exemplary embodiments of improved, press fit conduit outlet assemblies and condulet assemblies that may be universally used in the fabrication of electrical raceways are described below that overcome the deficiencies of conventional conduit interconnections discussed above. The inventive press fit conduit outlet assemblies disclosed herein establish an interference fit between a conduit and a condulet assembly, eliminating a need to use conventional, threaded conduit, simplifying connections in certain installations, and lowering the costs of conduit and time and labor costs to complete rigid metal conduit connections to construct an electrical raceway. To the extent that threaded conduit may still be utilized, the press fit conduit outlet assemblies may still be used without any need to create threads on any threaded conduits that are cut to a desired length. As such, the press fit conduit outlet assemblies can be used with threaded or unthreaded conduits. Further, the conduit outlet assemblies described herein desirably provide a path to electrical ground for a fabricated raceway. Method aspects in this disclosure will be in part apparent and in part explicitly discussed in the following description.

In a first aspect, an inventive press fit condulet assembly for a rigid metal conduit raceway of an electrical system includes a body having at least one mating end configured to connect to an end of a rigid metal conduit via cold pressing force. A sealing element extends between at least one mating end and a surface of the rigid metal conduit, and a grounding element extends between at least a portion of at least one mating end and the surface of the rigid metal conduit to establish an electrical path to the ground through the connected rigid metal conduit and the body. A simpler, quicker and more convenient, press fit connection of rigid metal conduits in an electrical conduit raceway is therefore possible that does not depend on threaded connections, while ensuring reliable mechanical interconnection and an electrical ground path established between the condulet assembly and the rigid metal conduit. The sealing element and a grounding element may extend between an inner surface of the condulet assembly and an outer surface of the conduit, or between an inner surface of the conduit and an outer surface of the conduit assembly, together with an optional adapter if needed to accommodate varying inner and outer diameters of the condulets and conduits utilized to fabricate the raceway, as well as different types of conduit (e.g., threaded and non-threaded).

In a second aspect, an inventive conduit outlet assembly is provided. The conduit outlet assembly includes a condulet assembly, a gasket, and a gripping ring. The gasket is sized to circumscribe an outer surface of a conduit. The gripping ring may be electrically conductive, and is sized to circumscribe an end of the conduit adjacent to the gasket. A press fit condulet assembly is sized to receive the end of the conduit with the gasket and the gripping ring thereon. When the condulet assembly is cold pressed to the conduit, the gasket establishes a seal between an inner surface of the condulet assembly and an outer surface of the conduit, and such that the gripping ring provides grounding for an electrical raceway. An optional adapter may be provided to accommodate varying inner and outer diameters of the condulets and conduits utilized to fabricate the raceway, as well as different types of conduit (e.g., threaded and non-threaded).

In a third aspect, an inventive electrical conduit assembly or electrical raceway is provided including a conduit having an end, and a condulet assembly press-fit to the end of the conduit. The condulet assembly may include a receiver/condulet having an inner surface sized to accept the end of the conduit and a gasket coupled to the conduit. The gasket establishes a seal between the inner surface of the condulet and the outer surface of the end of the conduit. An electrically-conductive gripping ring is coupled to the condulet and in surface contact with the inner surface of the condulet and the outer surface of the end of the conduit to provide an electrical ground path therebetween. An optional adapter may be provided to accommodate varying inner and outer diameters of the condulets and conduits utilized to fabricate the raceway, as well as different types of conduit (e.g., threaded and non-threaded).

In a fourth aspect, a rigid metal conduit raceway system is provided including a plurality of rigid metal conduits, and a plurality of press fit condulet assemblies establishing mechanical and electrical connections between respective ones of the plurality of rigid metal conduits. Optional adapters may be provided to accommodate varying inner and outer diameters of the condulets and conduits utilized to fabricate the raceway, as well as different types of conduit (e.g., threaded and non-threaded). The system may be provided in kit form as a set of modular components that can be conveniently fabricated into any desired raceway configurations.

In a fifth aspect, an inventive method of fabricating an electrical raceway is realized by the inventive conduit outlet assembly described herein. The method includes providing a conduit and a press fit condulet assembly, with the condulet assembly having an inner diameter at an end thereof that is greater than an outer diameter of the conduit at an end of the conduit. The method includes positioning a gripping ring about the end of the conduit, wherein the gripping ring includes an electrically-conductive material and provides grounding for the raceway, positioning a gasket about the end of the conduit such that the gasket is adjacent to the gripping ring, and inserting the end of the conduit into the end of the condulet assembly until the gripping ring and the gasket are disposed inside the condulet assembly. The mechanical and electrical connection is completed via cold pressing of the condulet assembly to the end of the conduit.

Cold pressing of the condulet assemblies further avoids time, expense and equipment to heat the components that other types of conventional processes require to join metal parts (e.g., welding) entail. An optional adapter may be provided to accommodate varying inner and outer diameters of the condulets and conduits utilized to fabricate the raceway, as well as different types of conduit (e.g., threaded and non-threaded).

The press fit conduit outlet assemblies and press fit methods for their installation meet longstanding and unfulfilled needs in the art in simplifying raceway fabrication, allowing dramatic reduction in time and labor costs to complete a raceway installation while ensuring reliability of the mechanical and electrical interconnections established. In the contemplated embodiments, inventive press fit conduit outlet assemblies designed to realize the cold-press conduit connections reduce time and labor costs by 30% to 50% over conventional raceway fabrication and installation processes.

FIG. 1 illustrates an exemplary known condulet fitting, fitting, or condulet 102 that is formed with hubs 104. Condulet 102 includes a wall 106 defining a cavity 107. In the exemplary embodiment, wall 106 is formed with an aperture that traverses therethrough and that is normally covered by a cover 108. Wall 106 and cover 108 may be fabricated from a variety of suitable materials including, but not limited to, steel, plastic, ceramic, and/or a combination of such materials.

Condulet 102 is formed with one or more hubs 104 to connect a rigid metal conduit thereto. In the exemplary embodiment, hubs 104 are identical and each is formed with hub threads 110 that extend circumferentially about its inner surface 112 at a distal end 114 of each hub 104. Each hub 104 has a substantially circular cross-sectional shape that has a diameter 118 that is slightly larger than an outer diameter (not shown in FIG. 1) of the conduit (not shown in FIG. 1) being coupled to the condulet. In one embodiment, a diameter 118 defined by an inner surface 112 is approximately equal to ½ inches (1.27 cm), 1½ inches (3.81 cm), 2 inches (5.08), and/or any other size of a conduit recognized as standard in the trade. Hub 104 further includes a bushing 124 that stops a conduit from being inserted too far into condulet 102. The conduit is formed with threads that complement and mate with hub threads 110 to enable the conduit to couple to hub 104.

Figure 2:
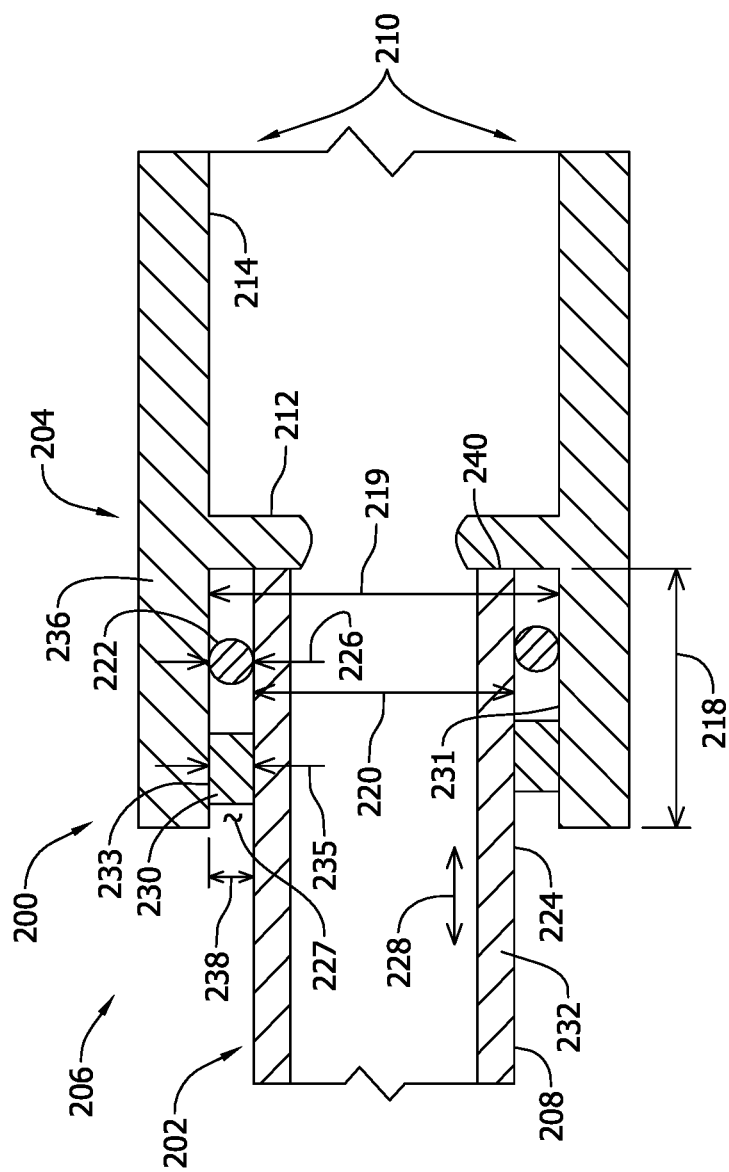
FIG. 2 is a sectional view of an exemplary press-fit condulet assembly coupled with a non-threaded conduit according to a first exemplary embodiment of the disclosure.

FIG. 2 is a sectional view of an exemplary improved conduit outlet assembly 200 for use in coupling a conduit 202 to a condulet 204 in a cold press fit fabrication of an electrical raceway 206 that includes conduits 202. Conduit 202 may be a rigid metal conduit. Conduit 202 may be of any size, including a standard trade size, as described above, and may include threads (not shown in FIG. 2) formed about its outer surface 208 at its end 224. In the exemplary embodiment, conduit 202 is a hollow thin-walled conduit that is not formed with threads. Moreover, in the exemplary embodiment, conduit 202 is formed with a substantially uniform outer diameter 220 defined by its outer surface 208.

In the exemplary embodiment, conduit outlet assembly 200 is formed with and includes a condulet assembly 210. More specifically, condulet assembly 210 is a cast metal body formed into a condulet 204. Condulet 204 includes an annular shoulder 212 that extend inwardly from its inner surface 214. Shoulder 212 is near an open end 236 of condulet assembly 210. Shoulder 212 extends generally radially inward to limit an insertion depth 218, i.e., a length that conduit 202 may be inserted within condulet open end 236. Surface of shoulder 212 may be smooth to limit scratches or damage to cables or wiring. In some embodiments, condulet assembly 210 may be formed with different sized condulets to enable different sized conduits to be coupled to condulet assembly 210.

In the exemplary embodiment, conduit 204 is formed with an inner diameter 219 that is slightly larger than an outer diameter 220 of conduit 202. As such, conduit 202 is sized to be at least partially inserted into condulet assembly 210, and more specifically, into condulet 204. The inner diameter 219 of the condulet 204 is exposed at the distal end thereof, such that the body of the condulet 204 is open-ended for an easier installation of the conduit. Compared to existing press fit couplers for electrical raceway fabrication, there is no end wall in the condulet body at the distal end that includes a smaller, restricted opening having a reduced diameter through which the conduit is inserted. Elimination of such an end wall simplifies the shape of the condulet 204 and lowers its cost of fabrication, while also simplifying the assembly for installation by providing a larger opening area for insertion of the conduit 202 at the distal end. Care is required, however, to avoid damaging the exposed sealing elements and grounding elements at the distal end during installation of the conduit.

Conduit outlet assembly 200, in the exemplary embodiment, further includes a gasket 222. Gasket 222 may be fabricated from any material that enables condulet assembly 210 to function as described herein, including but not limited to rubber, plastic, and/or elastomer. Moreover, a cross-sectional shape of gasket 222 may have any shape that enables the gasket to function as described herein, including but not limited to circular, elliptical, square, rectangular, triangular, octagonal, and/or combinations thereof. Furthermore, gasket 222 may be fashioned as an O-ring, a cylindrical band, and/or any other configuration that enables gasket 222 to function as described herein.

Gasket 222 is sized to circumscribe an end 224 of conduit 202. A height 226 of gasket 222 is selected to enable gasket 222 to substantially seal a gap 227 defined between conduit 202 and condulet assembly 210 when a compressive force is applied to condulet assembly 210. In the exemplary embodiment, gasket 222 is fabricated from a material that is at least partially elastic to enable gasket 222 to be compressed between condulet assembly 210 and conduit 202 as conduit end 224 is inserted into condulet assembly 210. Moreover, in the exemplary embodiment, gasket 222 extends continuously about conduit end 224. Alternatively, gasket 222 may be segmented and multiple pieces may be positioned about conduit end 224 in a manner that facilitates sealing as a compressive force is applied to condulet assembly 210. Gasket 222 may be positioned at any location along a length 228 of conduit 202 that enables gasket 222 to function as described herein. In each embodiment, gasket 222 substantially seals gap 227 defined between condulet assembly 210 and conduit 202 as gasket 222 is compressed and/or deformed by a compressive force (e.g., a press fitting).

Conduit outlet assembly 200 also includes a gripping ring 230. In the exemplary embodiment, gripping ring 230 is fabricated from electrically-conductive material. Gripping ring 230 may be cylindrical, round, or any other suitable shape that enables gripping ring 230 to function as described herein. For example, in one embodiment, gripping ring 230 may be formed to have a relatively simple rounded cross section (circular in the illustrated example) and a rough outer surface. Gripping ring 230 interacts with conduit outer surface 208 and/or with an inner surface 231 of condulet assembly 210 via friction created between the rough outer surface 233 of gripping ring 230 and conduit outer surface 208, and/or friction created between the rough outer surface 233 of gripping ring 230 and inner surface 231 of condulet assembly 210.

A thickness 235 of gripping ring 230 when uncompressed, is slightly larger than a height 238 of gap 227 defined between inner surface 231 of condulet assembly 210 at end 236 and conduit outer surface 208 at end 224. Thickness 235 of gripping ring 230 is reduced as gripping ring 230 is compressed after conduit 202 is inserted into condulet 204 during fabrication of raceway 206. Compression of the gripping ring changes its cross sectional shape to enlarge the surface area in contact with the conduit 202 on one side and the condulet 204 on the other side.

Gripping ring 230 is positioned adjacent to gasket 222 when raceway 206 is fabricated. Alternatively, gripping ring 230 may be positioned such that gasket 222 is between a tip 240 of conduit end 224 and gripping ring 230. When installed, gripping ring 230 provides a path to the electrical ground in the raceway. For example, if conduit wall 232 and/or condulet assembly 210 become electrically charged from static electricity, an internal short, and/or an external electrical source, gripping ring 230 provides a path to electrical ground.

In the exemplary embodiment, during assembly, conduit 202 is inserted into condulet 204 at end 236. End 236 is then compressed onto conduit end 224 via an applied force of a press tool, such as a hydraulic tool. In the exemplary embodiment, the compression causes deformation of condulet end 236 which ensures conduit 202 is securely coupled to condulet assembly 210. Moreover, during compression, gripping ring 230 is compressed to ensure a ground is created between conduit 202 and condulet 204. Furthermore, gasket 222 is also compressed to ensure the gap 227 between conduit 202 and condulet 204 is substantially sealed. Because of the deformation, the connection established is generally non-releasable such that condulet 204 is not reusable after condulet 204 is coupled to conduit 202 in a secure connection. As such, condulet 204 would need to be mechanically removed, such as via a cutting operation, from conduit 202 in order for the conduit to be re-used.

Figure 3:
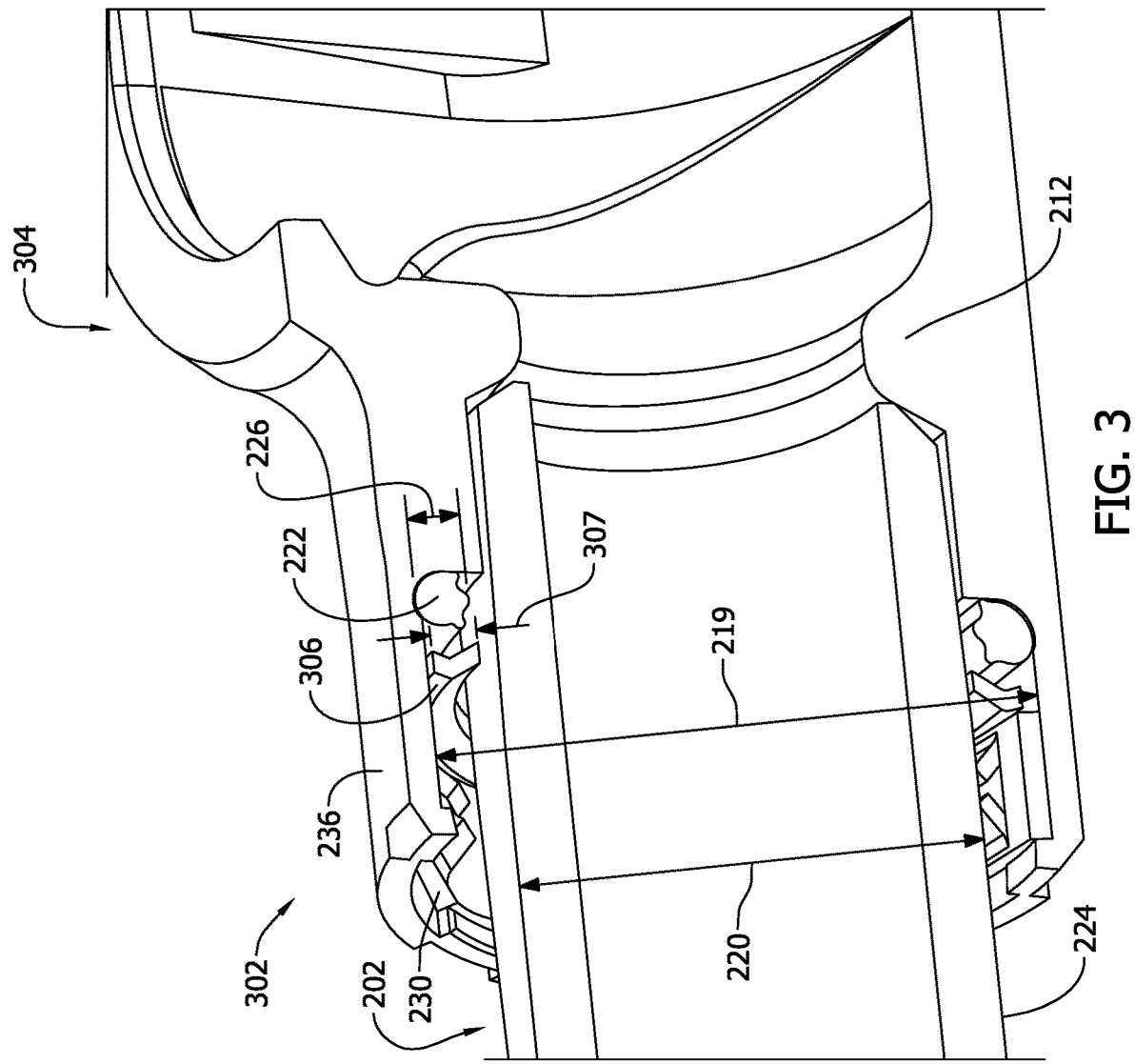
FIG. 3 is a perspective cross-sectional view of another exemplary press-fit condulet assembly coupled with a conduit according to a second exemplary embodiment of the disclosure.

FIG. 3 illustrates another exemplary conduit outlet assembly 302, with a conduit 202 inserted into condulet assembly 304. Conduit outlet assembly 302 includes a cast metal body that is similar to that shown in FIG. 2 and accordingly the like reference numerals are used in FIG. 2 are used to identify like components illustrated in FIG. 3. Compared to conduit outlet assembly 200 shown in FIG. 2, conduit outlet assembly 302 includes an optional washer 306. Washer 306 may be fabricated from any material that enables washer 306 to function as described herein, including but not limited to, a rubber material, a metallic material, and/or a cork material. Moreover, washer 306 may have any cross-sectional shape that enables washer 306 to function as described herein, including but not limited to circular, elliptical, square, rectangular, trapezoidal, triangular, and/or octagonal. Furthermore, washer 306 may extend continuously about conduit 202 in a single piece, or alternatively, may be made of multiple pieces spaced about conduit 202 in a manner that enables washer 306 to function as described herein.

In the exemplary embodiment, washer 306 is positioned between gripping ring 230 and gasket 222. A radial thickness or height 307 of washer 306 may be substantially the same as or less than a height 226 of gasket 222 when gasket 222 is compressed. As such, washer 306 does not inhibit gasket 222 from creating a substantially fluid-impervious seal when condulet assembly 304 is compressed against conduit 202. Washer 306 facilitates limiting movement of gasket 222 and/or gripping ring 230 and ensures that gasket 222 remains spaced apart from gripping ring 230. As a result, washer 306 facilitates maintaining a relative position of gasket 222 and/or gripping ring 230 during insertion of conduit 202 within condulet 204, and as condulet 204 is compressed onto conduit 202. Further, because gasket 222 is made of softer material than the metallic material of gripping ring 230, washer 306 serves as a separator between gripping ring 230 and gasket 222 to limit any damages to gasket 222 caused by gripping ring 230 when gripping ring 230 rubs against gasket 222.

Figure 4:
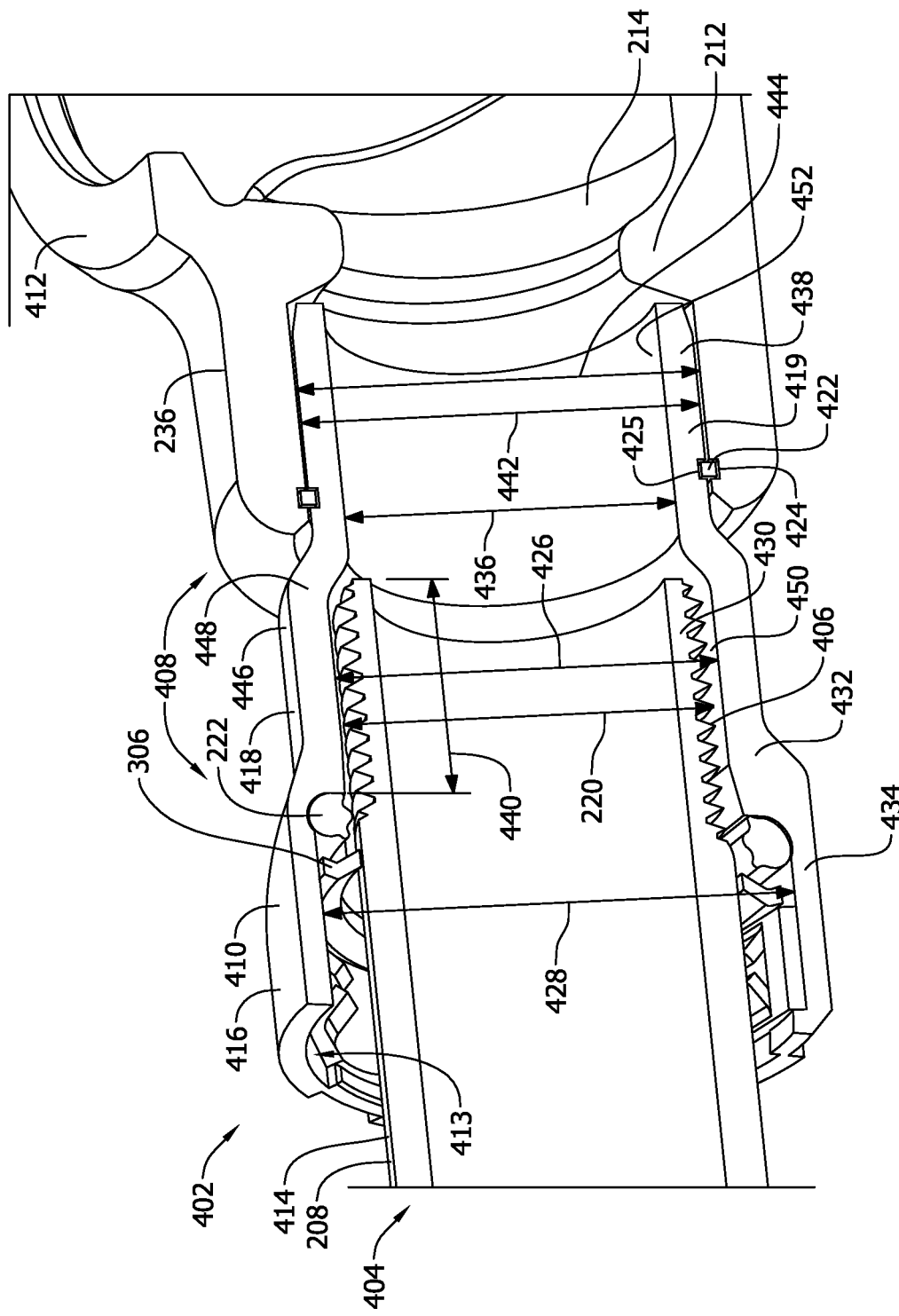
FIG. 4 is a perspective cross-sectional view of a further exemplary press-fit condulet assembly coupled with a conduit.

FIG. 4 illustrates another exemplary conduit outlet assembly 402 coupled with a conduit 404 that includes threads 406. In some embodiments, conduit 404 does not include threads 406. Conduit outlet assembly 402 includes a metal body that is substantially similar to that shown in FIGS. 2 and 3 and accordingly like reference numerals used in respective FIGS. 2 and 3 are also used to identify like components illustrated in FIG. 4. Compared to conduit outlet assemblies 200, 302 shown in FIGS. 2 and 3, conduit outlet assembly 402 includes a condulet assembly 408 that includes an adapter 410, besides a condulet 412. Condulet 412 may be integrally formed. In the exemplary embodiment, adapter 410 facilitates coupling conduit 404 to conduit outlet assembly 402 and is coupled between conduit 404 and condulet 412. In the exemplary embodiment, conduit 404 is formed with threads 406 along its outer surface 208. However, conduit outlet assembly 402 is not formed with mating threads along its inner surface 413. By virtue of the adapter 410, however, the threaded end of the conduit 404 may nonetheless be securely press fit to the condulet 412.

Adapter 410 enables conduit 404 to be inserted within and coupled to conduit outlet assembly 402 such that gasket 222 and gripping ring 230 are compressed against conduit outer surface 208. Some or all of gasket 222, gripping ring 230, and if applicable washer 306, are compressed against smooth conduit outer surface 414 as shown. Because the adapter axially extends that position of the gasket 222, gripping ring 230, and washer 306 farther away from the condulet 412 on outer surface 208 of conduit 404, the threads 406 do not affect the positioning of gasket 222, gripping ring 230, or if applicable washer 306 on conduit end 430, which may be press fit to the conduit 404 at a location past the threads 406. In another contemplated embodiment, however, one or more of the gasket 222, gripping ring 230, and washer 306 may alternatively be pressed against threads 406. Either way, the threaded end of the conduit 404 can be inserted into the condulet 412 for press fit connection thereto without having to cut the threaded end of the conduit 404 in order to accomplish the press fit connection. As such, the adapter 410 allows for more or less universal use of the condulet 412 with different types of conduits (e.g., threaded and non-threaded).

The adapter 410 also bridges different diameters of the condulet 412 and conduit 404 via different portions of the adapter 410 having different internal and external diameters to complete connections between conduit 404 and condulet 412 that otherwise may not be possible. For instance, the adapter 410 may allow press fit connection of a conduit having an external diameter that equals or exceeds the internal diameter of the condulet, or may allow for press fit connection of a condulet having an internal diameter that well exceeds the external diameter of a conduit. More or less universal use of the condulet 412 with different diameter conduits is therefore possible by virtue of the adapter 410.

In the exemplary embodiment, adapter 410 includes a compression section 416, a transition section 418, and a coupling section 419. Gasket 222, gripping ring 230, and if applicable washer 306, are positioned within compression section 416 of adapter 410 rather than in condulet 412. As such, only compression section 416 of the adapter 410 is press-fit via compressive force to complete the connection to the conduit 404. Compression of the condulet 412 is not required to complete the press fit connection. Adapter 410 may be fabricated from any material that enables adapter 410 to function as described herein, including but not limited to metallic materials, composite materials, and/or plastic materials, for example. To provide an electrical path to electrical ground between the condulet 412 and the conduit 404 through the adapter 410, the adapter 410 is fabricated to include electrically-conductive materials, either wholly or partially in the adapter construction. The adapter 410 may further be fabricated using the same or different material(s) used to fabricate the condulet 412, including but not limited to cast steel or malleable iron.

Transition section 418 extends between compression and coupling sections 416 and 419, respectively, and has an inner diameter 426 that is smaller than an inner diameter 428 of compression section 416. Inner diameter 426 is defined by a smooth wall 432 that extends between compression section wall 434 and a wall 438 defining an inner diameter 436 of coupling section 419. In some embodiments, transition section 418 has a length 440 that is selected to enable transition section 418 to extend about an entire length or at least majority of the length of conduit threads 406. In some embodiments, choice of length 440 is not influenced by the length of conduit threads 406. Accordingly, inner diameter 426 of transition section 418 is slightly larger than an outer diameter 220 of conduit 404 such that conduit threads 406 are received snugly within transition section 418. Transition section 418 is not compressed when compression forces are applied to adapter 410.

Coupling section 419 of adapter 410 is formed with an outer diameter 442 that is slightly smaller than an inner diameter 444 of condulet 412 at condulet end 236. As such, coupling section 419 is sized for insertion within condulet 412 in a snug fit. Condulet assembly 408 also includes a retaining ring 422 inserted within a groove 424 formed in inner surface 214 of condulet 412 and/or a groove 425 formed in outer surface 446 of adapter 410. Retaining ring 422 facilitates securely coupling adapter 410 with condulet 412. Moreover, ring 422 facilitates substantially sealing any gap defined between adapter outer surface 446 and condulet inner surface 214. Retaining ring 422 may be a continuous piece that circumscribes outer surface 446 of adapter 410, or alternatively, may be a segmented member that includes multiple pieces spaced about outer surface 446. Moreover, retaining ring 422 may be fabricated from any material that enables ring 422 to function as described herein, including but not limited to, rubber, plastic, metal, and elastomer, for example. Further, ring 422 may be fabricated from an electrically-conductive material to facilitate a ground path connection between the condulet 412 and the adapter 410.

Inner diameter 436 of coupling section 419 is smaller than conduit outer diameter 220. As such, a transition shoulder 448 is defined between transition section inner wall 450 and coupling section inner wall 452. Transition shoulder 448 facilitates limiting an insertion depth of conduit 404 within adapter 410. Similarly, shoulder 212 of condulet 412 facilitates limiting an insertion depth of adapter 410 within condulet 412.

Figure 5:
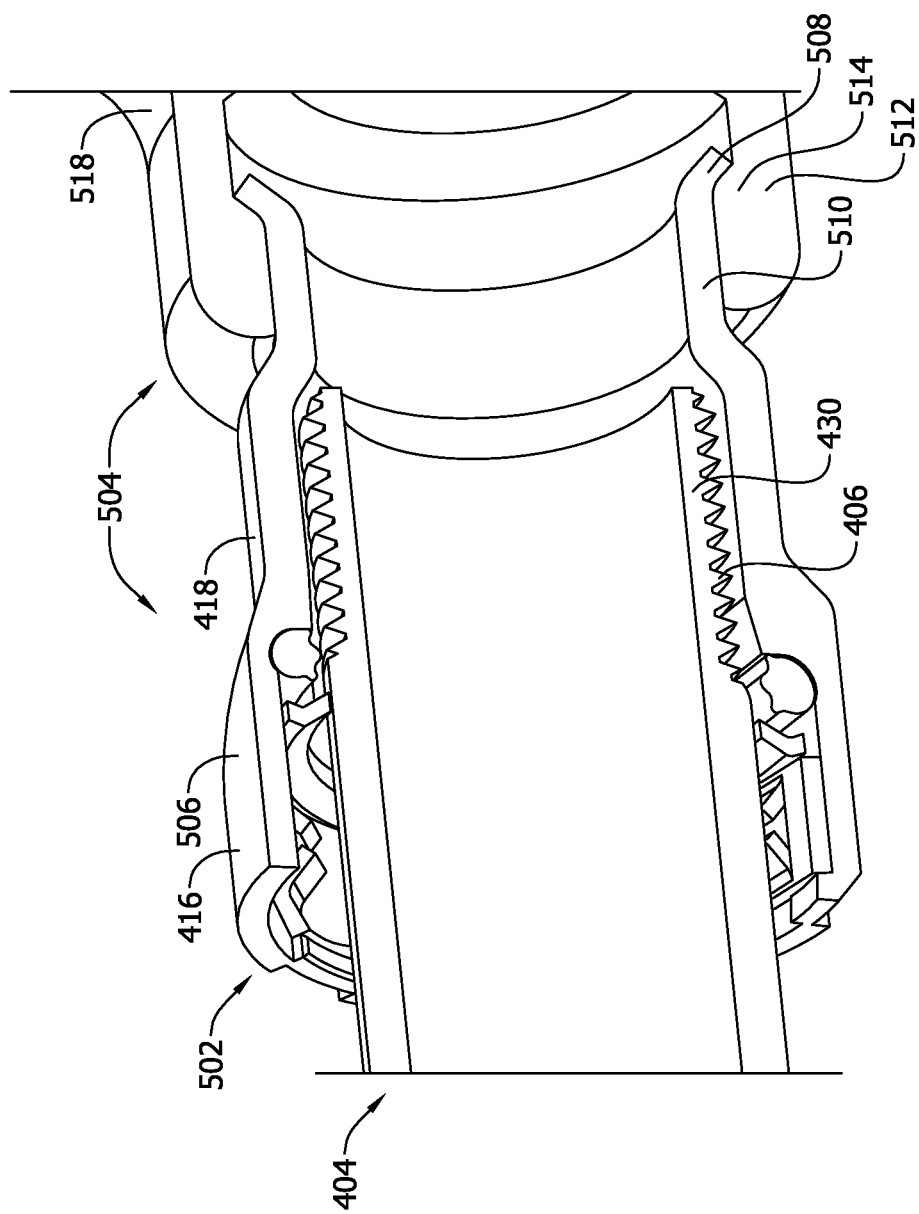
FIG. 5 is a perspective cross-sectional view of yet another exemplary press-fit condulet assembly coupled with a conduit.

FIG. 5 illustrates yet another exemplary conduit outlet assembly 502 coupled with a conduit 404. Conduit outlet assembly 502 includes a cast metal body that is similar to that shown in FIG. 4, and hence like reference numerals in FIG. 4 are used to indicate like features in FIG. 5. Similar to condulet assembly 408 shown in FIG. 4, condulet assembly 504 of conduit outlet assembly 502 also includes an adapter 506, besides a condulet 518. In the exemplary embodiment, adapter 506 includes a compression section 416, a transition section 418, and a coupling section 510 that includes a flared end 508. In the exemplary embodiment, adapter 506 facilitates coupling conduit 404 to condulet 518 and is coupled between conduit 404 and condulet 518. More specifically, in the exemplary embodiment, conduit 404 is formed with threads 406 along its outer surface 208. However, conduit outlet assembly 502 is not formed with mating threads along its inner surface 413.

Adapter 506 may be fabricated from any material that enables adapter 506 to function as described herein, including but not limited to metallic materials, composite materials, and/or plastic materials, for example.

Coupling section 510 of adapter 506 is formed with an outer diameter 442 that is slightly smaller than an inner diameter 444 of condulet 518 at condulet end 512. Moreover, coupling section 510 includes a flared end 508. Flared end 508 compresses radially inwardly while adapter 506 is inserted into condulet 518 and then snaps outwardly to be retained by a retaining shoulder 514 formed within condulet end 512. Alternatively, adapter 506 and condulet 518 are preassembled such that the flared end 508 has been disposed within condulet end 512.

Although conduits 404 shown in FIGS. 4 and 5 have threads, condulet assemblies 408 and 504 can also be used with conduit 202 (shown in FIGS. 2 and 3), which does not include threads at its end, and vice versa. That is, condulet assemblies 210 and 304 (shown in respective FIGS. 2 and 3) may likewise be used with a conduit 404 that includes threads 406 or a conduit without threads. Condulet assemblies disclosed herein may also be used with a conduit including a tapered end or tapered threads with or without an adapter.

Further, adapter 410, 506 shown in FIGS. 4 and 5 may be used to couple conduit 404, threaded or unthreaded, with a conventional condulet 102 that has threaded hubs 104. In operation, conventional condulet 102 is used in place of condulet 412, 518. As a result, threads need not to be created on the conduit or cumbersome coupling of long conduit into a condulet can be avoided.

While a single condulet assembly/conduit connection and a single conduit outlet assembly is shown in FIGS. 2-5, in contemplated embodiments the condulets and condulet assemblies shown in FIGS. 2-5 would be provided in combination in the same press fit condulet to interconnect two or more conduits in any desired orientation to the same condulet. For example, the press-fit assemblies described in FIGS. 2-5 could be integrated on opposing ends of the same condulet assembly to realize a similar conduit connection and outlet to the condulet shown in FIG. 1, albeit with press-fittings instead of threads. In such a combination, the condulets used on each end may be the same or different from one another to accommodate, for example, a threaded end of conduit on one side and a non-threaded end of the conduit on the other side. Numerous variations are possible in this regard to connect the same or different types of conduits in-line to one another (i.e., substantially aligned to extend along a common axis), at right angles to one another, or at oblique angles to one another as desired or as needed to complete raceway installations at particular sites.

A rigid metal conduit raceway system may be assembled including any number of rigid metal conduits, and any number of press fit condulet assemblies establishing mechanical and electrical connections between respective ones of the plurality of rigid metal conduits. The conduits and/or condulet assemblies described herein may be provided as modular components in the form of a kit to construct raceway systems of a predetermined type that may avoid any need to cut the conduits on a job site, or as a kit of modular component parts that may be creatively used by an installer to fabricate raceway runs in any configuration desired.

FIG. 6 shows an exemplary method 600 of fabricating an electrical raceway. Method 600 includes providing 602 a conduit and a press fit condulet assembly. The press fit condulet assembly may include any of the examples or embodiments described above, and accordingly may include an inner diameter at an end of the condulet assembly greater than the outer diameter of the conduit at an end of the conduit. Method 600 further includes positioning 604, a gripping ring, such as any of the gripping rings described above, about an end of the conduit. Method 600 also includes positioning 606 a gasket, including any of the gaskets described above, about the end of the conduit such that gasket is adjacent to the gripping ring. Further, method 600 includes inserting 608 an end of the conduit into the end of the condulet assembly until the gripping ring and the gasket are positioned inside the condulet assembly. The assembly is completed by applying a cold compression force to the outer surface of the condulet assembly to compress the gasket, the gripping ring, and either the condulet or an adapter to couple to the conduit.

The configurations of the conduit and conduit outlet assembly may be reversed from the embodiments illustrated in another contemplated embodiment. That is, the condulet may be inserted into a conduit directly or indirectly through an adapter, while still providing a sealed connection including an electrical ground path. Similarly, the configurations of the adapter and the condulet may be reversed such that the condulet is inserted into an adapter to complete a sealed connection including a ground path.

The exemplary embodiments of conduit outlet assemblies described herein include a gasket for sealing the connection between condulet assemblies and the conduit, a gripping ring that provides grounding of the raceways, and an optional washer. Threads do not need to be created before connecting condulet assemblies with conduits. Conduit outlet assemblies and condulet assemblies described herein may be used with unthreaded or threaded sections of conduits, replacing conduit connections via threaded hubs. The seal formed by the conduit outlet assembly keeps water from entering into the conduit.

The benefits and advantages of the inventive concepts are now believed to have been amply illustrated in relation to the exemplary embodiments disclosed. For example, the embodiments described herein facilitate raceway fabrication without creating threads on conduits or without using conduit having threads, thereby reducing or eliminating cost, safety risks, and labor associated with threaded connections between conduits and condulets. Avoiding a need to create threads also reduces or eliminates imperfections such as burrs in the conduits, thereby reducing or eliminating damage to electrical wires when being pulled through and/or weakened threaded connection. Additionally, embodiments of the systems and methods provide a secure connection of conduits through which electrical wires run. For example, the seal formed by the conduit outlet assemblies described herein keeps water from entering inside conduits and interfering with electricity carried by electrical wires, thereby eliminating additional material or processes to seal the connections in known systems and methods. Further, embodiments of the systems and methods provide a grounding path for the raceway. For example, gripping rings of the conduit outlet assemblies described herein also serve as a grounding path for the raceway, thereby eliminating additional material or procedures to establish grounding path for the raceway, especially when the conduit and condulets are not formed with electrically-conductive material.

An embodiment of a conduit outlet assembly for a rigid metal conduit raceway of an electrical system has been disclosed. A conduit outlet assembly includes a gasket, a gripping ring, and a condulet assembly. The gasket is sized to circumscribe an outer surface of a rigid metal conduit of the rigid metal conduit raceway. The gripping ring is sized to circumscribe the outer surface of the rigid metal conduit. The condulet assembly is sized to receive the rigid metal conduit, and includes an adapter and a condulet. The adapter includes a compression section and a coupling section, wherein the compression section is sized to receive the rigid metal conduit with the gasket and the gripping ring disposed thereon. The condulet is sized to receive the coupling section of the adapter.

Optionally, after the condulet assembly is press-fitted onto the rigid metal conduit, the gasket establishes a seal between the condulet assembly and the rigid metal conduit. The gripping ring includes an electrical conductive material and provides grounding for the rigid metal conduit raceway. The conduit outlet assembly is configured to receive a rigid metal conduit having an unthreaded end, and the gasket is configured to establish a seal between the condulet assembly and the rigid metal conduit at the unthreaded end. The adapter further includes a transition section formed between the compression section and the coupling section, the transition section having an inner diameter between an inner diameter of the compression section and an inner diameter of the coupling section. The adapter further includes a transition shoulder defined between the transition section and the coupling section, the transition shoulder configured to restrict the rigid metal conduit from being inserted farther into the conduit assembly. The conduit outlet assembly further includes a ring, wherein the condulet includes a groove formed in an inner surface of the condulet and sized to receive the ring. The coupling section includes a flared end, and the condulet includes a retaining shoulder configured to retain the flared end when the coupling section is inserted into the condulet. The condulet includes a shoulder extending circumferentially from an inner surface of the condulet and configured to restrict the coupling section of the adapter from being inserted farther into the condulet.

Another embodiment of a conduit outlet assembly for a rigid metal conduit raceway of an electrical system has been disclosed. The conduit outlet assembly includes a gasket, a gripping ring, and a condulet assembly. The gasket is sized to circumscribe an outer surface of a rigid metal conduit of the rigid metal conduit raceway. The gripping ring includes an electrical conductive material and sized to circumscribe the outer surface of the rigid metal conduit. The condulet assembly is sized to receive the rigid metal conduit with the gasket and the gripping ring disposed thereon. After the condulet assembly is press-fitted onto the rigid metal conduit, the gasket establishes a seal between the condulet assembly and the rigid metal conduit and the gripping ring provides grounding for the rigid metal conduit raceway.

Optionally, the conduit outlet assembly is configured to receive a rigid metal conduit having an unthreaded end, and the gasket is configured to establish a seal between the condulet assembly and the rigid metal conduit at the unthreaded end. The condulet assembly includes a condulet sized to receive the rigid metal conduit with the gasket and the gripping ring disposed thereon. The condulet assembly includes a condulet including a shoulder extending circumferentially from an inner surface of the condulet. The condulet assembly further includes an adapter including a compression section and a coupling section, wherein the compression section is sized to receive the rigid metal conduit with the gasket and the gripping ring disposed thereon, and a condulet sized to receive the coupling section of the adapter. The adapter further includes a transition section formed between the compression section and the coupling section, the transition section having an inner diameter between an inner diameter of the compression section and an inner diameter of the coupling section. The conduit outlet assembly further includes a ring, wherein the condulet includes a groove formed in an inner surface of the condulet and sized to receive the ring. The coupling section includes a flared end, and the condulet includes a retaining shoulder configured to retain the flared end when the coupling section is inserted into the condulet. The condulet includes a shoulder extending circumferentially from an inner surface of the condulet and configured to restrict the coupling section of the adapter from being inserted farther into the condulet.

An embodiment of a method of fabricating a rigid metal conduit raceway of an electrical system has been disclosed. The method includes providing a rigid metal conduit and a condulet assembly, the condulet assembly sized to receive the rigid metal conduit. The method further includes circumscribing an outer surface of the rigid metal conduit with a gripping ring at an end of the rigid metal conduit, wherein the gripping ring includes an electrically-conductive material. The method also includes circumscribing the outer surface of the rigid metal conduit adjacent the gripping ring with a gasket, and inserting the end of the rigid metal conduit into an end of the condulet assembly until the gripping ring and the gasket are disposed inside the condulet assembly. Further, the method includes applying compression force to an outer surface of the condulet assembly to compress the condulet assembly, the gasket, and the gripping ring against the rigid metal conduit such that the gasket establishes a seal between the condulet assembly and the rigid metal conduit. The gripping ring provides grounding for the rigid metal conduit raceway.

Optionally, providing a rigid metal conduit and a condulet assembly further includes providing an adapter and a condulet, the adapter including a compression section and a coupling section, the compression section sized to receive the rigid metal conduit with the gasket and the gripping ring disposed thereon, and the condulet sized to receive the coupling section of the adapter. Inserting the end of the rigid metal conduit further includes coupling the coupling section of the adapter to the condulet to form the condulet assembly, and inserting the end of the rigid metal conduit into the compression section of the adapter until the gripping ring and the gasket are disposed inside the condulet assembly. Applying compression force further includes applying compression force to an outer surface of the compression section of the adapter to compress the compression section, the gasket, and the gripping ring against the rigid metal conduit.

While exemplary embodiments of components, assemblies and systems are described, variations of the components, assemblies and systems are possible to achieve similar advantages and effects. Specifically, the shape and the geometry of the components and assemblies, and the relative locations of the components in the assembly, may be varied from that described and depicted without departing from inventive concepts described. Also, in certain embodiments certain of the components in the assemblies described may be omitted to accommodate particular types of conduit or the needs of particular installations, while still providing cost effective cold press fit coupling connections of conduit for electrical wiring or cabling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A conduit outlet assembly for a rigid metal conduit raceway of an electrical system, comprising:
   a gasket sized to circumscribe an outer surface of a rigid metal conduit of the rigid metal conduit raceway;
   a gripping ring sized to circumscribe the outer surface of the rigid metal conduit; and
   a condulet assembly sized to receive the rigid metal conduit, comprising:
   an adapter sized to receive the rigid metal conduit with the gasket and the gripping ring disposed thereon; and a condulet sized to receive the adapter.

2. The conduit outlet assembly of claim 1, wherein after the condulet assembly is press-fitted onto the rigid metal conduit, the gasket establishes a seal between the condulet assembly and the rigid metal conduit.

3. The conduit outlet assembly of claim 1, wherein the gripping ring comprises an electrical conductive material and provides grounding for the rigid metal conduit raceway.

4. The conduit outlet assembly of claim 1, wherein the conduit outlet assembly is configured to receive a rigid metal conduit having an unthreaded end, and the gasket is configured to establish a seal between the condulet assembly and the rigid metal conduit at the unthreaded end.

5. The conduit outlet assembly of claim 1, wherein the adapter further comprises a compression section, a coupling section, and a transition section defined between the compression section and the coupling section, the transition section having an inner diameter between an inner diameter of the compression section and an inner diameter of the coupling section.

6. The conduit outlet assembly of claim 5, wherein the adapter further comprises a transition shoulder defined between the transition section and the coupling section, the transition shoulder configured to restrict the rigid metal conduit from being inserted farther into the condulet assembly.

7. The conduit outlet assembly of claim 1, wherein the adapter further comprises a coupling section, and the coupling section comprises a flared end, and the condulet comprises a retaining shoulder configured to retain the flared end when the coupling section is inserted into the condulet.

8. A rigid metal conduit raceway of an electrical system, comprising:
   a rigid metal conduit; and
   a conduit outlet assembly, comprising:
   a gasket sized to circumscribe an outer surface of the rigid metal conduit of the rigid metal conduit raceway;
   a gripping ring comprising an electrical conductive material and sized to circumscribe the outer surface of the rigid metal conduit; and
   a condulet assembly sized to receive the rigid metal conduit with the gasket and the gripping ring disposed thereon,
   wherein after the condulet assembly is press-fitted onto the rigid metal conduit, the conduit outlet assembly establishes mechanical interconnection between the condulet assembly and the rigid metal conduit without dependence on threaded connections between the condulet assembly and the rigid metal conduit.

9. The rigid metal conduit raceway of claim 8, wherein the conduit outlet assembly is configured to receive a rigid metal conduit having an unthreaded end, and the gasket is configured to establish a seal between the condulet assembly and the rigid metal conduit at the unthreaded end.

10. The rigid metal conduit raceway of claim 8, wherein the condulet assembly comprises a condulet including a shoulder extending circumferentially from an inner surface of the condulet.

11. The rigid metal conduit raceway of claim 8, wherein the condulet assembly further comprises:
    an adapter comprising a compression section and a coupling section, wherein the compression section is sized to receive the rigid metal conduit with the gasket and the gripping ring disposed thereon; and
    a condulet sized to receive the coupling section of the adapter.

12. The rigid metal conduit raceway of claim 11, wherein the adapter further comprises a transition section defined between the compression section and the coupling section, the transition section having an inner diameter between an inner diameter of the compression section and an inner diameter of the coupling section.

13. The rigid metal conduit raceway of claim 11, wherein the coupling section comprises a flared end, and the condulet comprises a retaining shoulder configured to retain the flared end when the coupling section is inserted into the condulet.

14. A method of fabricating a conduit outlet assembly for a rigid metal conduit raceway of an electrical system, the method comprising:
    providing a gasket sized to circumscribe an outer surface of a rigid metal conduit of the rigid metal conduit raceway;
    providing a gripping ring including an electrical conductive material and sized to circumscribe the outer surface of the rigid metal conduit; and
    providing a condulet assembly sized to receive the rigid metal conduit with the gasket and the gripping ring disposed thereon,
    wherein after the condulet assembly is press-fitted onto the rigid metal conduit, the conduit outlet assembly establishes mechanical interconnection between the condulet assembly and the rigid metal conduit without dependence on threaded connections between the condulet assembly and the rigid metal conduit, and
    wherein the condulet assembly includes an adapter sized to receive the rigid metal conduit with the gasket and the gripping ring disposed thereon, and a condulet sized to receive the adapter.

15. The method of claim 14, wherein the adapter further comprises a compression section, a coupling section, and a transition section defined between the compression section and the coupling section, the transition section having an inner diameter between an inner diameter of the compression section and an inner diameter of the coupling section.

16. The method of claim 15, wherein the adapter further comprises a transition shoulder defined between the transition section and the coupling section, the transition shoulder configured to restrict the rigid metal conduit from being inserted farther into the condulet assembly.

17. The method of claim 15, wherein the coupling section comprises a flared end, and the condulet comprises a retaining shoulder configured to retain the flared end when the coupling section is inserted into the condulet.

18. The conduit outlet assembly of claim 1, wherein the conduit outlet assembly is configured as a module.

19. The rigid metal conduit raceway of claim 8, further comprising:
   a plurality of rigid metal conduits; and
   a plurality of conduit raceway assemblies establishing mechanical interconnection with respective ones of the plurality of rigid metal conduits.

\* \* \* \* \*